United States Patent [19]

Eriksson et al.

[11] Patent Number: 4,815,139

[45] Date of Patent: Mar. 21, 1989

[54] ACTIVE ACOUSTIC ATTENUATION SYSTEM FOR HIGHER ORDER MODE NON-UNIFORM SOUND FIELD IN A DUCT

[75] Inventors: Larry J. Eriksson, Madison; Mark C. Allie, Oregon; Richard H. Hoops, Stoughton, all of Wis.

[73] Assignee: Nelson Industries, Inc., Stoughton, Wis.

[21] Appl. No.: 168,932

[22] Filed: Mar. 16, 1988

[51] Int. Cl.[4] ........................ H04B 15/00; H04R 1/28

[52] U.S. Cl. ........................................ 381/71; 381/94

[58] Field of Search .................... 381/71, 73.1, 94, 92, 381/96

[56] References Cited

U.S. PATENT DOCUMENTS

| | | | |
|---|---|---|---|
| 4,473,906 | 9/1984 | Warnaka | 381/71 |
| 4,665,549 | 5/1987 | Eriksson et al. | 381/71 |
| 4,677,676 | 6/1987 | Eriksson | 381/71 |
| 4,677,677 | 6/1987 | Eriksson | 381/71 |
| 4,683,590 | 7/1987 | Miyoshi | 381/94 |
| 4,736,431 | 4/1988 | Allie | 381/71 |

OTHER PUBLICATIONS

L. J. Eriksson, "Higher Order Mode Effects in Circular Ducts and Expansion Chambers", J. Acoust. Soc. Am., 68(2), Aug. 1980, pp. 545-550.

S. J. Elliott, I. M. Stothers and P. A. Nelson, "A Multiple Error LMS Algorithm and Its Application to the Active Control of Sound and Vibration", IEEE Trans. on Acoustics, Speech and Signal Processing, vol. ASSP-35, No. 10, Oct. 1987, pp. 1423-1434.

J. C. Burgess, Journal of Acoustic Society of America, 70(3), Sep. 1981, pp. 715-726.

M. P. Schroeder, "Number Theory in Science and Communications", Berlin: Springer-Verlag, 1984, pp. 252-261.

*Primary Examiner*—Tommy P. Chin

*Attorney, Agent, or Firm*—Andrus, Sceales, Starke & Sawall

[57] ABSTRACT

A system is provided for increasing the frequency range of an active acoustic attenuation system in a duct without increasing cut-off frequency $f_c$ of the duct or otherwise splitting or partitioning the duct into separate ducts or chambers. The frequency range is increased above $f_c$ to include higher order modes. A plurality of cancelling model sets are provided. Each transverse portion of the acoustic pressure wave has its own set of an adaptive filter model, cancelling speaker, and error microphone. A single input microphone may service all sets.

38 Claims, 2 Drawing Sheets

FIRST HIGHER ORDER MODE

SECOND HIGHER ORDER MODE

ACTIVE ACOUSTIC ATTENUATION SYSTEM FOR HIGHER ORDER MODE NON-UNIFORM SOUND FIELD IN A DUCT

BACKGROUND AND SUMMARY

The invention relates to active acoustic attenuation systems, and provides a system for cancelling undesirable output sound in a duct for higher order mode non-uniform sound fields. The invention arose during continuing development efforts relating to the subject matter shown and described in U.S. Pat. Nos. 4,677,677, 4,677,676 and 4,665,549, and allowed U.S. application Ser. No. 922,282, now U.S. Pat. No. 4,736,431 filed Oct. 23, 1986, all assigned to the assignee of the present invention and incorporated herein by reference.

A sound wave propagating axially through a rectangular duct has a cut-off frequency $f_c = c/2L$ where c is the speed of sound in the duct and L is the longer of the transverse dimensions of the duct. Acoustic frequencies below the cut-off frequency $f_c$ provide plane and uniform pressure acoustic waves extending transversely across the duct at a given instant in time. Acoustic frequencies above $f_c$ allow non-uniform pressure acoustic waves in the duct due to higher order modes.

For example, an air conditioning duct may have transverse dimensions of two feet by six feet. The longer transverse dimension is six feet. The speed of sound in air is 1,130 feet per second. Substituting these quantities into the above equation yields a cut-off frequency $f_c$ of 94 Hertz.

In circular ducts similar considerations apply when the duct diameter is approximately equal to one-half of the wavelength. Exact equations may be found in L. J. Eriksson, Journal of Acoustic Society of America, 68(2), Aug. 1980, pp. 545–550.

Active attenuation involves injecting a cancelling acoustic wave to destructively interfere with and cancel an input acoustic wave. In the given example, the acoustic wave can be presumed as a plane uniform pressure wave extending transversely across the duct at a given instant in time only at frequencies less than 94 Hertz. At frequencies less than 94 Hertz, there is less than a half wavelength across the longer transverse dimension of the duct. At frequencies above 94 Hertz, the wavelength becomes shorter and there is more than a half wavelength across the duct, i.e. a higher order mode with a non-uniform sound field may propagate through the duct.

In an active acoustic attenuation system, the output acoustic wave is sensed with an error microphone which supplies an error signal to a control model which in turn supplies a correction signal to a cancelling loudspeaker which injects an acoustic wave to destructively interfere with the input acoustic wave and cancel same such that the output sound at the error microphone is zero. If the sound wave traveling through the duct is a plane wave having uniform pressure across the duct, then it does not matter where the cancelling speaker and error microphone are placed along the cross section of the duct. In the above example for a two foot by six foot duct, if a plane wave with uniform pressure is desired, the acoustic frequency must be below 94 Hertz. If it is desired to attenuate higher frequencies using plane uniform pressure waves, then the duct must be split into separate ducts of smaller cross section or the duct must be partitioned into separate chambers to reduce the longer transverse dimension L to less than c/2f at the frequency f that is to be attenuated.

In the above example, splitting the duct into two separate ducts with a central partition would yield a pair of ducts each having transverse dimensions of two feet by three feet. Each duct would have a cut-off frequency $f_c$ of 188 Hertz.

The above noted approach to increasing the cut-off frequency $f_c$ is not economically practicable because active acoustic attenuation systems are often retrofitted to existing ductwork, and it is not economically feasible to replace an entire duct with separate smaller ducts or to insert partitions extending through the duct to provide separate ducts or chambers.

The present invention solves the above noted problem in a particularly simple and cost effective manner. The invention provides a method for increasing the frequency range of an active acoustic attenuation system in a duct without increasing cut-off frequency $f_c$ of the duct or otherwise splitting the duct into separate ducts or partitioning the duct into separate chambers.

The invention eliminates the need to reduce the longer transverse dimension L of the duct to less than c/2f. Instead, the invention increases the frequency range above $f_c$ to include higher order modes. A plurality N of cancelling model sets are provided. Each set has its own adaptive filter model, cancelling speaker, and error microphone. A single input microphone may service all sets. The duct has a transverse dimension greater than a half wavelength, and there is non-uniform acoustic pressure transversely across the duct at a given instant in time.

The invention can also be used with modes that have non-uniform pressure distribution in both transverse dimensions of a rectangular or other shape duct. The invention may also be used with modes that have non-uniform pressure distribution in both the radial and circumferential dimensions of a circular duct.

In general, the invention provides an active attenuation system for attenuating an undesired elastic wave in an elastic medium. The elastic wave propagates axially and has non-uniform pressure distribution transversely across the medium such that the wave has a plurality of portions in the transverse direction at a given instant in time, including at least one positive pressure portion and at least one negative pressure portion. A plurality of output transducers are provided, one for each of the positive and negative pressure portions of the undesired elastic wave. The output transducers introduce a plurality of cancelling elastic waves into the medium. A plurality of error transducers are provided, one for each of the positive and negative pressure portions of the undesired elastic wave. The error transducers sense the combined undesired elastic wave and the cancelling elastic waves, and provide a plurality of error signals. A plurality of adaptive filter models are provided, one for each of the positive and negative pressure portions of the undesired elastic wave. Each model has an error input from a respective error transducer, and outputs a correction signal to a respective output transducer to introduce the respective cancelling elastic wave. Each of the positive and negative portions of the undesired elastic wave has its own set of an adaptive filter model, output transducer, and error transducer.

BRIEF DESCRIPTION OF THE DRAWINGS

FIG. 1 shows the acoustic pressure distribution of the plane wave mode.

DETAIL DESCRIPTION

Figure 1:
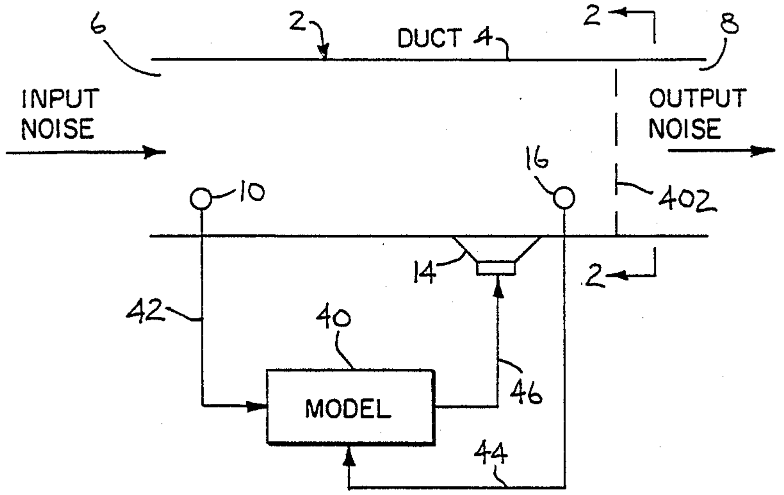
FIG. 1 PRIOR ART
FIG. 1 is a schematic illustration of acoustic system modeling in accordance with above noted incorporated U.S. Pat. Nos. 4,677,676 and 4,677,677.

FIG. 1 shows a modeling system in accordance with incorporated U.S. Pat. No. 4,677,677, FIG. 5, and like reference numerals are used from said patent where appropriate to facilitate clarity. The acoustic system 2 includes an axially extending duct 4 having an input 6 for receiving input noise and an output 8 for radiating or outputting output noise. The acoustic wave providing the noise propagates axially left to right through the duct. The acoustic system is modeled with an adaptive filter model 40 having a model input 42 from input microphone or transducer 10 and an error input 44 from error microphone or transducer 16, and outputting a correction signal at 46 to omnidirectional output speaker or transducer 14 to introduce cancelling sound waves such that the error signal at 44 approaches a given value such as zero. The cancelling acoustic wave from output transducer 14 is introduced into duct 4 for attenuating the output acoustic wave. Error transducer 16 senses the combined output acoustic wave and cancelling acoustic wave and provides an error signal at 44. The acoustic system is modeling with an adaptive filter model 40, as in the noted incorporated patents. The input acoustic wave is sensed with input transducer 10, or alternatively an input signal is provided at 42 from a tachometer or the like which gives the frequency of a periodic input acoustic wave, such as from an engine or the like, without actually measuring or sensing such noise.

Figure 2:
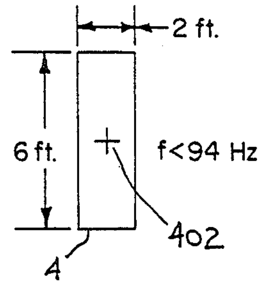
FIG. 2 PRIOR ART
FIG. 2 is a sectional view of the acoustic pressure distribution taken along line 2—2 of the duct of FIG. 1.

FIG. 2 shows a cross sectional view of duct 4 at a given instant in time for the above noted example, where the duct has transverse dimensions of two feet by six feet. The cut-off frequency $f_c$ of the acoustic wave travelling axially in the duct (out of the page in FIG. 2) is given by $f_c=c/2L$, where $f_c$ is the cut-off frequency, c is the speed of sound in the duct, and L is the longer of the transverse dimensions of the duct, namely six feet. Thus in the example given, $f_c=94$ Hertz. Acoustic frequencies below 94 Hertz provide plane and uniform pressure acoustic waves in the duct. This is shown at wave 402 in FIG. 1 having positive pressure across the entire transverse dimension of the duct at a given instant in time as shown at the plus sign 402 in FIG. 2.

Figure 3:
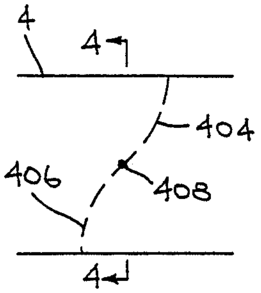
FIG. 3 is a schematic illustration showing the duct of FIG. 1 and the acoustic pressure distribution of the first higher order mode.
Figure 4:
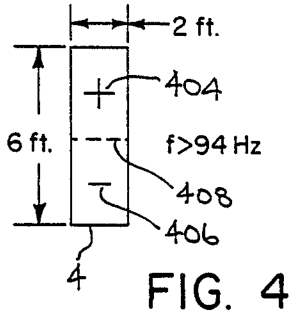
FIG. 4 is a sectional view of the acoustic pressure distribution taken along line 4—4 of FIG. 3.

At acoustic frequencies greater than $f_c$, there may be a non-uniform acoustic pressure wave at a given instant in time across the duct due to higher order modes. This is because the transverse dimension of the duct is greater than one-half the wavelength of the acoustic wave. FIG. 3 shows the first higher order mode wherein the acoustic frequency is greater than $f_c$. In the example shown, for a two foot by six foot duct, the acoustic frequency is greater than 94 Hertz. The acoustic wave at a given instant in time has a positive pressure portion 404, as shown in FIG. 3 and at the plus sign in FIG. 4. At the same given instant in time, the acoustic wave also has a negative pressure portion 406, as shown in FIG. 3 and at the minus sign in FIG. 4. This first higher order mode has a node 408 between wave portions 404 and 406.

Figure 5:
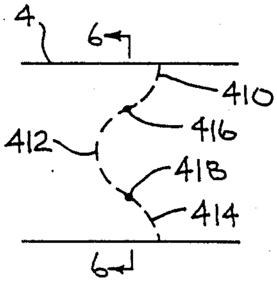
FIG. 5 is a schematic illustration showing the duct of FIG. 1 and the acoustic pressure distribution of the second higher order mode.
Figure 6:
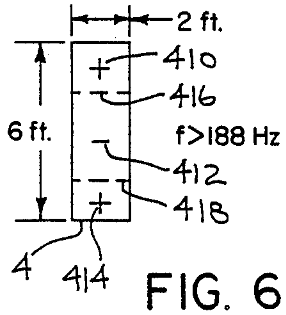
FIG. 6 is a sectional view of the acoustic pressure distribution taken along line 6—6 of FIG. 5.

FIGS. 5 and 6 show the second higher order mode with a portion 410 of positive pressure, a portion 412 of negative pressure, and a portion 414 of positive pressure, separated by respective nodes 416 and 418 at a given instant in time. The acoustic frequency is greater than $2f_c$, i.e. greater than 188 hertz. In the second higher order mode, there are two pressure nodes 416 and 418, each separating a portion of the acoustic wave of positive and negative pressure. Further higher order modes continue in like manner. For example, the third higher order mode associated with the transverse dimension L has four portions separated by three pressure nodes at a given instant in time.

One manner of insuring plane uniform pressure acoustic waves across the transverse dimension of the duct at a given instant in time is to increase the cut-off frequency $f_c$. This may be accomplished by splitting the duct into separate ducts or partitioning the duct into separate chambers to reduce the longer transverse dimension L to less than c/2f. For example, in FIG. 6, partitions may be provided axially longitudinally to split or partition the duct into three separate ducts or chambers each having transverse dimensions of two feet by two feet, such that only a half wavelength at 282 hertz can fit within each duct chamber. This raises the overall cut-off frequency to 282 hertz, without higher order modes in any of the separate chambers. This enables active acoustic attenuation of plane uniform pressure acoustic waves of frequencies up to 282 hertz.

Most active acoustic attenuation systems are retrofitted to existing ductwork, and hence the above noted approach of partitioning the duct into separate ducts or chambers is usually not economically feasible because of the substantial installation and retrofit cost of installing such partitions in existing ductwork. Without the partitions, only frequencies below 94 hertz, in the above example, will have a plane uniform pressure acoustic wave across the duct free of higher order modes.

The present invention provides a system for increasing the frequency range of an active acoustic attenuation system without increasing cut-off frequency $f_c$ or otherwise splitting the duct into separate ducts or partitioning the duct into separate chambers to reduce the longer transverse dimension L to less than c/2f.

Figure 7:
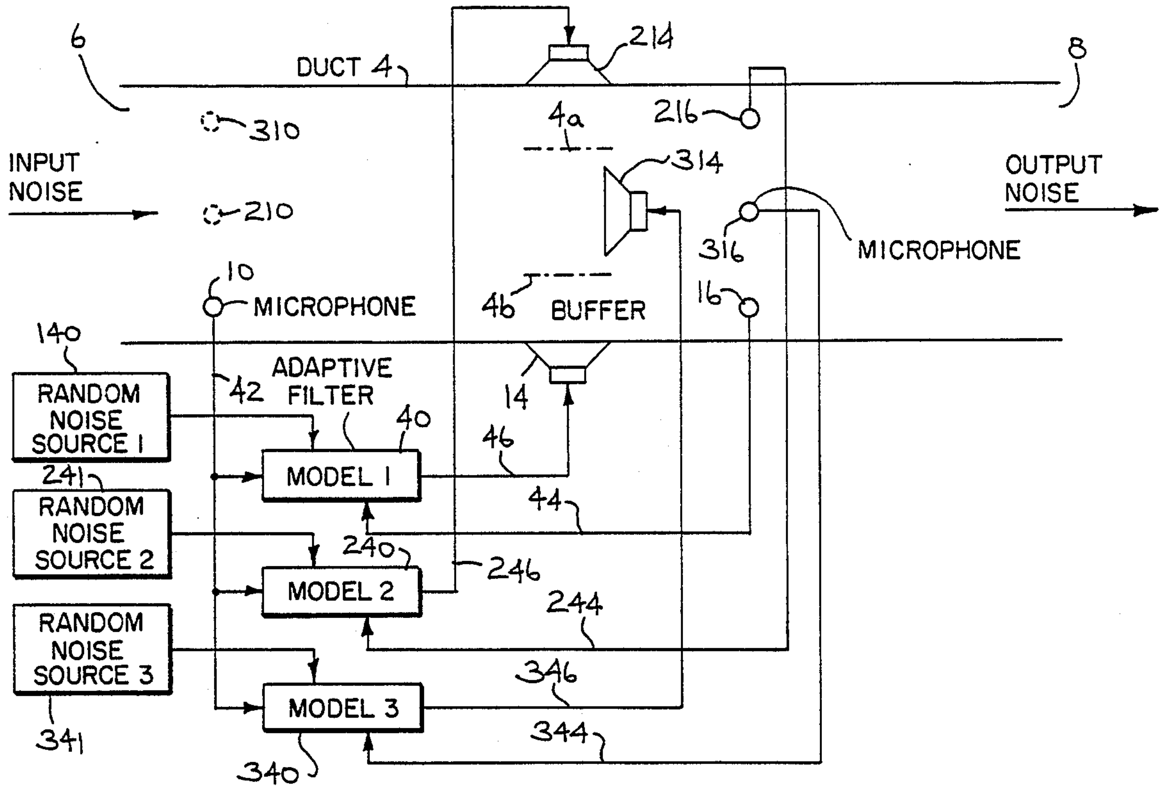
FIG. 7 is a schematic illustration of an active acoustic attentuation system in accordance with the invention.

FIG. 7 shows a system in accordance with the invention, and uses like reference numerals from FIG. 1 and the above noted incorporated patents where appropriate to facilitate clarity. A plurality of cancelling acoustic waves are output into the duct from a plurality of output transducers or speakers 14, 214, 314, one for each negative or positive pressure portion of the acoustic wave, for attenuating the output acoustic wave providing the output noise. The combined output acoustic wave and the cancelling acoustic waves are sensed by a plurality of error transducers or microphones 16, 216, 316, one for each portion of the acoustic wave, respectively, which error microphones provide error signals at 44, 244, 344, respectively. The acoustic system is modeled with a plurality of adaptive filter models 40, 240, 340, one for each portion of the acoustic wave, respectively. Each adaptive filter model has an error input 44, 244, 344, from a respective one of the error microphones and outputs a correction signal at 46, 246, 346, to a respective one of the output speakers 14, 214, 314, to introduce the respective auxiliary cancelling acoustic wave.

The sound from speaker 14 travels back along a feedback path to the input transducer provided by input microphone 10. Likewise, sound from speakers 214 and 314 travel back along feedback paths to input microphone 10. The feedback path from speaker 14 to input microphone 10 is modeled with the same model 40 such that model 40 adaptively models both the acoustic system 4 and the feedback path. Likewise, the feedback path from speaker 214 to input microphone 10 is modeled with the same model 240 such that model 240 adaptively models both acoustic system 4 and the noted feedback path. Likewise, the feedback path from speaker 314 to input microphone 10 is modeled with the same model 340 such that model 340 adaptively models both duct 4 and the noted feedback path. None of the models 40, 240 or 340 uses separate on-line modeling of duct 4 and off-line modeling of the respective feedback path. Off-line modeling of the respective feedback paths using broadband noise to pre-train a separate dedicated feedback filter is not necessary. The feedback path is part of the model used for adaptively modeling the entire system. Each model is an adaptive recursive filter model having a transfer function with both poles and zeros, as in the noted incorporated patents. The use of poles to model the feedback path is significant. Individual finite impulse response (FIR) filters are not adequate to truly adaptively cancel direct and feedback noise. Instead, a single infinite impulse response (IIR) filter is needed to provide truly adaptive cancellation of the direct noise and acoustic feedback. Thus, each of models 40, 240 and 340 adaptively recursively models the acoustic system and the feedback path on-line. Since each model is recursive, it provides the IIR characteristic present in the acoustic feedback loop wherein an impulse will continually feed upon itself in feedback manner to provide an infinite response.

The feedback path from speaker 14 to input microphone 10 is modeled by using the error signal at 44. The feedback paths from speakers 214 and 314 to input microphone 10 are modeled by using the respective error signals at 244 and 344 from respective error microphones 216 and 316. The feedback path from speaker 14 to input microphone 10 is modeled by using the error signal at 44 as one input to model 40 and the correction signal at 46 as another input to model 40, FIG. 7 of incorporated U.S. Pat. No. 4,677,676. Likewise, each of the feedback paths from speakers 214 and 314 to input microphone 10 are modeled by using the respective error signals at 244 and 344 from the respective error microphones 216 and 316 as one input to the respective models 240 and 340 and the respective correction signals 246 and 346 to the respective speakers 214 and 314 as another input to the respective model 240 and 340 as in FIG. 7 of incorporated U.S. Pat. No. 4,677,676.

The system of FIG. 7 increases the frequency range of the active acoustic attenuation system above $f_c$. N acoustic waves are output into the duct from N output transducer speakers 14, 214, 314, for attenuating the output acoustic wave providing the output noise at 8. The combined output acoustic wave and the N acoustic waves from the N speakers are sensed with N error transducers 16, 216, 316, providing N error signals 44, 244, 344. The acoustic system is modeled with N adaptive filter models 40, 240, 340, having error inputs from respective error microphones 16, 216, 316, and outputting N correction signals 46, 246, 346, respectively, to the N speakers 14, 214, 314, such that the N error signals approach respective given values. In FIG. 7, N=3. N equals the number of portions of negative and positive pressure present in the acoustic wave extending transversely across the duct at a given instant in time. For example, in a first higher order mode system, N=2. In a second higher order mode system, N=3, as in FIG. 7.

One or more input signals representing the input acoustic wave providing the input noise at 6 are provided to the adaptive filter models 40, 240, 340. Only a single input signal need be provided, and the same such input signal may be input to each of the adaptive filter models, at 42. In FIG. 7, an input microphone 10 provides a single input transducer sensing the input acoustic wave and supplying such input signal. Alternatively, the input signal may be provided by a transducer such as a tachometer which provides the frequency of a periodic input acoustic wave such as from an engine or the like. Further alternatively, the input signal may be provided by one or more error signals, in the case of a periodic noise source, J. C. Burgess, Journal of Acoustic Society of America, 70(3), Sep. 1981, pp. 715–726.

Further alternatively, a plurality of input transducers such as microphones 10, 210, 310, may be provided, each sensing the input noise and providing a separate input signal respectively to models 40, 240, 340. It has been found that multiple input microphones are not needed. It is believed that this is because the acoustic pressure at position 10 is related to the acoustic pressure at the other positions such as 210 and 310 by appropriate transfer functions which are adaptively modeled and compensated in the respective models by the coefficients in the numerators and denominators of the IIR pole-zero filter models, particularly if a high number of coefficients are used.

In FIG. 7, N random noise sources 140, 241, 341, introduce noise into each of the N models 40, 240, 340, respectively, such that each of the N error microphones 14, 214, 314, respectively, also senses the auxiliary noise from the auxiliary noise sources and additionally models each respective output transducer speaker 14, 214, 314, and each respective error path from each respective speaker to each respective error microphone 16, 216, 316, respectively, all on-line without separate modeling and without dedicated pre-training, as in FIGS. 19 and 20 of incorporated U.S. Pat. No. 4,677,676. The noise from each auxiliary noise source is random and uncorrelated to the input acoustic wave providing the input noise at 6, and is provided by a Galois sequence, M. P. Schroeder, "Number Theory in Science and Communications", Berlin: Springer-Verlag, 1984, page 252–261. The Galois sequence is a psuedorandom sequence that repeats after $2^{M-1}$, where M is the number of stages in a shift register. The Galois sequence is preferred because it is easy to calculate and can easily have a period much longer than the response time of the system. The auxiliary noise sources 140, 241, 341, enable additional adaptive modeling of the characteristics of each of the speakers 14, 214, 314, and the error paths from such speakers to the output microphones, 16, 216, 316, on an on-line basis.

In one embodiment, local baffles 4a, 4b, are provided in duct 4 between the speakers 14, 214, 314, to minimize interaction between the speakers. The baffles are local and extend only adjacent the speakers, and do not extend along the length of the duct nor between the output microphones 16, 216, 316. Local baffles are easy to install during installation of the speakers 14, 214, 314, and do not involve substantial additional retrofit cost as compared to splitting or otherwise partitioning the duct into separate ducts or chambers along the entire or substantially the entire axial length thereof.

Each model 40, 240, 340, comprises a recursive least mean square filter including a first algorithm 12, FIG. 7 of incorporated U.S. Pat. No. 4,677,676, having a first input 42 from the input microphone, a second input 49 from its respective error signal 44 from its respective error microphone, and an output, and a second algorithm 22 having a first input from its respective correction signal 46 to its respective output speaker, a second input 47 from its respective error signal 44 from its respective error microphone, and an output, and a summing junction 48 having inputs from the outputs of the first and second algorithms, and an output providing the respective correction signal 46 to the respective one of the N output speakers. In another embodiment, FIGS. 8 and 9 of incorporated U.S. Pat. No. 4,677,676, each of the N models 40, 240, 340, includes a first algorithm 12 having a first input 42 from the input microphone, a second input 49 from the respective error signal 44 from its respective one of the N error microphones, and an output, a first summing junction 52 having a first input from the respective error signal 44 from the respective one of the N error microphones, a second input from the respective correction signal 46 to the respective one of the N speakers, and an output 54, second algorithm means 22 having a first input from the output 54 of the first summing junction 52, a second input 47 from the respective error signal 44 from the respective one of the N error microphones and an output, and a second summing junction 48 having inputs from the outputs of the first and second algorithms 12 and 22, and an output providing the respective correction signal 46 to the respective one of the N output speakers.

The system of FIG. 7 may be extended for use in both transverse dimensions of the duct for applications where both transverse dimensions are greater than a half wavelength resulting in higher order modes that have non-uniform sound fields in both transverse directions at a given instant in time.

The system of FIG. 7 may be extended for use in circular ducts containing higher order modes that have non-uniform sound fields in both radial and circumferential directions at a given instant in time.

In general, the active attenuation system of FIG. 7 may be used for attenuation of an undesired elastic wave in an elastic medium. The elastic wave has non-uniform pressure distribution in the medium at a given instant in time along a direction transverse to the direction of propagation such that the wave has a plurality of portions along the transverse direction at the given instant in time including at least one positive pressure portion and at least one negative pressure portion.

It is recognized that various equivalents, alternatives and modifications are possible within the scope of the appended claims.

We claim:

1. An active attenuation system for attenuating an undesired elastic wave propagating in an elastic medium, said elastic wave having non-uniform pressure distribution in said medium at a given instant in time along a direction transverse to the direction of propagation, such that said wave has a plurality of portions along the transverse direction including at least one positive pressure portion and at least one negative pressure portion, a plurality of output transducers, one for each of said positive and negative pressure portions of said undesired elastic wave, said output transducers introducing a plurality of cancelling elastic waves into said medium, a plurality of error transducers, one for each of said positive and negative pressure portions of said undesired elastic wave, said error transducers sensing the combined said undesired elastic wave and said cancelling elastic waves, and providing a plurality of error signals, a plurality of adaptive filter models, one for each of said positive and negative pressure portions of said undesired elastic wave, each said model having an error input from a respective said error transducer and outputting a correction signal to a respective said output transducer to introduce the respective said cancelling elastic wave, such that each said portion of said undesired elastic wave has its own set of an adaptive filter model, output transducer, and error transducer.

2. The invention according to claim 1 wherein said adaptive filter models comprise adaptive recursive filter models, each having a transfer function with both poles and zeros.

3. The invention according to claim 1 comprising means providing one or more auxiliary elastic waves which are random and uncorrelated to said undesired elastic wave, said one or more auxiliary elastic waves being introduced into each of said models, such that each of said error transducers also senses the auxiliary elastic waves and additionally models each respective said output transducer and each respective error path from each respective said error transducer, all on-line without separate modeling and without dedicated pretraining.

4. In an active acoustic attenuation system for attenuating an acoustic wave in an acoustic system including an axially extending duct having an input for receiving an input acoustic wave and an output for radiating an output acoustic wave, said acoustic wave propagating axially through said duct, said duct having a higher order mode cut-off frequency $f_c$, wherein acoustic frequencies below $f_c$ provide plane and uniform pressure acoustic waves transversely across said duct at a given instant in time, a method for increasing the frequency range of said active acoustic attenuation system without increasing $f_c$ or otherwise splitting said duct into separate ducts or partitioning said duct into separate chambers, comprising increasing said frequency range to include higher order modes wherein the acoustic wave has a plurality of portions extending transversely across said duct at a given instant in time including at least one positive pressure portion and at least one negative pressure portion, comprising:

introducing a plurality of cancelling acoustic waves into said duct from a plurality of output transducers, one for each of said positive and negative pressure wave portions, for attenuating said output acoustic wave;

sensing the combined said output acoustic wave and said cancelling acoustic waves with a plurality of error transducers, one for each of said positive and negative pressure wave portions, and providing a plurality of error signals;

modeling said acoustic system with a plurality of adaptive filter models, one for each of said positive and negative pressure wave portions, each said model having an error input from a respective said error transducer and outputting a correction signal to a respective said output transducer to introduce the respective said cancelling acoustic wave.

5. The invention according to claim 4 comprising modeling said acoustic system with adaptive recursive filter models each having a transfer function with both poles and zeros.

6. The invention according to claim 4 comprising modeling said acoustic system with adaptive recursive least mean square filter models.

7. The invention according to claim 4 comprising:

sensing said input acoustic wave with input transducer means;

modeling each of the feedback paths from said output transducers to said input transducer means with the same respective adaptive filter model, without a separate model pre-trained solely to the respective feedback path, by modeling each said feedback path as part of said respective adaptive filter model such that each said adaptive filter model adaptively models both said acoustic system and said respective feedback path, without separating modeling of said acoustic system and said respective feedback path and without dedicated pre-training of said respective adaptive filter model with a broad band acoustic signal.

8. The invention according to claim 7 comprising modeling each of said feedback paths by using the respective said error signal from the respective said error transducer.

9. The invention according to claim 7 comprising modeling each of said feedback paths by using the respective said error signal from the respective said error transducer as one input to the respective said model and the respective said correction signal to the respective said output transducer as another input to the respective said model.

10. The invention according to claim 4 comprising providing auxiliary noise source means and introducing noise therefrom into each of said models, such that each of said error transducers also senses the noise from said auxiliary noise source means and additionally models each respective said output transducer and each respective error path from each respective output transducer to each respective said error transducer, all on-line without separate modeling and without dedicated pre-training.

11. The invention according to claim 10 comprising introducing noise from said auxiliary noise source means which is random and uncorrelated to said input acoustic wave.

12. The invention according to claim 11 wherein said auxiliary noise source means comprises a plurality of auxiliary noise sources, one for each of said error transducers.

13. The invention according to claim 4 comprising minimizing interaction between said output transducers by providing one or more baffles therebetween, said baffles being local and extending only adjacent said output transducers and not between said error transducers.

14. In an active acoustic attenuation system for attenuating an acoustic wave in an acoustic system including an axially extending duct having an input for receiving an input acoustic wave and an output for radiating an output acoustic wave, said acoustic wave propagating axially through said duct, said duct having a higher order mode cut-off frequency $f_c$, wherein acoustic frequencies below $f_c$ provide plane and uniform pressure acoustic waves transversely across said duct at a given instant in time, and wherein acoustic frequencies above $f_c$ provide a higher order mode such that said acoustic wave has N portions extending transversely across said duct at a given instant in time, where $N \geqq 2$, including at least one positive pressure portion and at least one negative pressure portion, a method for increasing the frequency range of said active acoustic attentuation system above $f_c$, comprising:

outputting N acoustic waves into said duct from N output transducers, respectively, for attenuating said output acoustic wave;

sensing the combined said output acoustic wave and said N acoustic waves from said N output transducers with N error transducers and providing N error signals, respectively;

modeling said acoustic system with N adaptive filter models having error inputs from respective said error transducers and outputting N correction signals, respectively, to said N output transducers, to introduce said N acoustic waves, such that said N error signals approach respective given values.

15. The invention according to claim 14 comprising providing one or more input signals representing said input acoustic wave, and modeling said acoustic system with said adaptive filter models having inputs from said one or more input signals.

16. The invention according to claim 15 comprising providing a single said input signal representing said input acoustic wave, and inputting the same said input signal to each of said adaptive filter models.

17. The invention according to claim 16 comprising providing a single input transducer sensing said input acoustic wave and supplying said input signal.

18. The invention according to claim 15 comprising providing a plurality of said input signals, one for each of said adaptive filter models, respectively.

19. The invention according to claim 18 comprising providing a plurality of input transducers sensing said input acoustic wave and supplying said input signals, respectively.

20. The invention according to claim 14 comprising providing auxiliary noise source means and introducing noise therefrom into each of said N models, such that each of said N error transducers also senses the auxiliary noise from said auxiliary noise source means.

21. The invention according to claim 20 comprising introducing noise from said auxiliary noise source means which is random and uncorrelated to said input acoustic wave.

22. The invention according to claim 21 wherein said auxiliary noise source means comprises N auxiliary noise sources, and comprising introducing noise from each of said N noise sources into a respective one of said N models such that each of said N error transducers also senses the auxiliary noise from its respective one of said N auxiliary noise sources.

23. The invention according to claim 14 comprising providing local baffles in said duct between said N output transducers to minimize interaction therebetween.

24. In an acoustic system including an axially extending duct having an input for receiving an input acoustic wave and an output for radiating an output acoustic wave, said acoustic wave propagating axially through said duct, said duct having a higher order mode cut-off frequency $f_c$, such that said acoustic wave has N portions extending transversely across said duct at a given instant in time, where N is ≧2, including at least one positive pressure portion and at least one negative pressure portion, an active acoustic attenuation system comprising:

N output transducers outputting N acoustic waves, respectively, for attenuating said output acoustic wave;

N error transducers sensing the combined said output acoustic wave and said N acoustic waves from said N output transducers and providing N error signals, respectively;

N adaptive filter models adaptively modeling said acoustic system, each model having an error input from a respective one of said N error transducers and outputting a correction signal to a respective one of said N output transducers to introduce a respective one of said N acoustic waves such that each of said N error signals approaches a given respective value.

25. The invention according to claim 24 comprising input transducer means providing one or more input signals representing said input acoustic wave, and wherein each of said N filter models adaptively models said acoustic system on-line without dedicated off-line pre-training and also adaptively models the feedback path from the respective one of said N output transducers to said input transducer means on-line for both broadband and narrowband acoustic waves without dedicated off-line pre-training, and outputs its respective said correction signal to its respective one of said N output transducers to introduce its respective one of said N acoustic waves.

26. The invention according to claim 25 wherein each of said N models comprises means adaptively modeling its respective said feedback path as part of said respective model itself without a separate model dedicated solely to said respective feedback path and pre-trained thereto.

27. The invention according to claim 24 wherein each of said N models comprises an adaptive recursive filter.

28. The invention according to claim 27 wherein each said filter has a transfer function with both poles and zeros.

29. The invention according to claim 28 wherein each said model comprises a recursive least mean square filter.

30. The invention according to claim 25 wherein each of said N models comprises:

first algorithm means having a first input from said input transducer means, a second input from its respective error signal from its respective one of said N error transducers, and an output;

second algorithm means having a first input from its respective said correction signal to its respective one of said N output transducers, a second input from its respective said error signal from its respective one of said N error transducers, and an output;

a summing junction having inputs from said outputs of said first and second algorithm means, and an output providing the respective said correction signal to the respective one of said N output transducers.

31. The invention according to claim 25 wherein each of said N models comprises:

first algorithm means having a first input from said input transducer means, a second input from the respective said error signal from the respective one of said N error transducers, and an output;

second algorithm means having a first input from said output acoustic wave, a second input from its respective said error signal from its respective one of said N error transducers, and an output; and a summing junction having inputs from said outputs of said first and second algorithm means, and an output providing the respective said correction signal to the respective one of said N output transducers.

32. The invention according to claim 25 wherein each of said N models comprises:

first algorithm means having a first input from said input transducer means, a second input from the respective said error signal from its respective one of said N error transducers, and an output;

a first summing junction having a first input from the respective said error signal from the respective one of said N error transducers, a second input from the respective said correction signal to the respective one of said N output transducers, and an output;

second algorithm means having a first input from said output of said first summing junction, a second input from the respective said error signal from the respective one of said N error transducers, and an output; and a second summing junction having inputs from said outputs of said first and second algorithm means, and an output providing the respective said correction signal to the respective one of said N output transducers.

33. The invention according to claim 25 wherein each of said N output transducers is a microphone, said input transducer means is one or more microphones, and each of said N output transducers is a speaker.

34. The invention according to claim 24 comprising:

auxiliary noise source means introducing auxiliary noise into each of said N adaptive filter models which is random and uncorrelated with said input acoustic wave; and a second set of N adaptive filter models each having a model input from said auxiliary noise source means and an error input from a respective one of said N error transducers.

35. The invention according to claim 34 comprising summer means summing auxiliary noise from said auxiliary noise source means with the outputs of each of said first mentioned N filter models and supplying the result as the respective said correction signal to the respective one of said N output transducers.

36. The invention according to claim 35 wherein each of said adaptive filter models in said second set of N models comprises algorithm means, and comprising second summer means summing the outputs of the respective one of said N error transducers and N algorithm means, and comprising multiplier means multiplying the output of said second summer means with auxiliary noise from said auxiliary noise source means and supplying the result as a weight update signal to said algorithm means.

37. The invention according to claim 34 wherein each of said N adaptive filter models adaptively models said acoustic system on-line without dedicated off-line pre-training, and also models the feedback path from the respective one of said N output transducers to said input transducer means on-line without dedicated off-line pre-training, each of said N models having a model input from said input transducer means and an error input from the respective one of said N error transducers and outputting a correction signal to the respective one of said N output transducers to introduce the respective one of said N acoustic waves such that the respective one of said N error signals approaches a given value, and comprising:

a second set of N adaptive filter models, each adaptively modeling both a respective said error path and a respective one of said N output transducers on-line without dedicated off-line pre-training; and a copy of each of said models in said second set of N adaptive filter models, each copy being in a respective one of said first mentioned N adaptive filter models to compensate for both the respective said error path and the respective one of said N output transducers adaptively on-line.

38. The invention according to claim 24 comprising local baffle means in said duct between said N output transducers to minimize interaction therebetween, said baffle means being local to said output transducers and not extending between said N error transducers.

* * * * *